US008223664B2

(12) United States Patent  
Ko et al.

(10) Patent No.: US 8,223,664 B2
(45) Date of Patent: Jul. 17, 2012

(54) ADAPTIVE UPLINK PROTOCOL

(75) Inventors: You-Chang Ko, Seoul (KR); Sumit Roy, Bothell, WA (US)

(73) Assignee: Empire Technology Development LLC, Wilmington, DE (US)

( * ) Notice: Subject to any disclaimer, the term of this patent is extended or adjusted under 35 U.S.C. 154(b) by 398 days.

(21) Appl. No.: 12/542,096

(22) Filed: Aug. 17, 2009

(65) Prior Publication Data

US 2011/0039545 A1 Feb. 17, 2011

(51) Int. Cl.
*H04W 24/02* (2009.01)
*H04W 28/18* (2009.01)
*H04W 72/04* (2009.01)
*G08C 17/02* (2006.01)

(52) U.S. Cl. ........ 370/252; 370/314; 370/348; 370/445; 370/449; 455/452.1; 455/509; 340/12.51; 340/13.26

(58) Field of Classification Search .................. 370/252, 370/314, 345–348, 445, 446, 449, 498; 455/423, 455/450, 452.1, 453, 509; 340/12.51, 13.24, 340/13.26
See application file for complete search history.

(56) References Cited

U.S. PATENT DOCUMENTS

| 5,615,212 | A  | * | 3/1997  | Ruszczyk et al. ............. 370/433 |
| 7,339,919 | B2 |   | 3/2008  | Harada                               |
| 7,639,708 | B1 | * | 12/2009 | Snodgrass et al. ............ 370/458 |
| 7,855,997 | B2 | * | 12/2010 | Adams et al. ................. 370/337 |
| 2003/0193903 | A1 | * | 10/2003 | Abi-Nassif et al. ........... 370/252 |
| 2009/0040021 | A1 | * | 2/2009 | Seo et al. ..................... 340/10.1 |
| 2010/0109847 | A1 | * | 5/2010 | Noel et al. .................... 340/10.2 |

OTHER PUBLICATIONS

Xin-qing et al, A Comparative Study on the Performance of the RFID Tag Collision Resolution Protocols, IEEE 2008, pp. 469-472.*
Xin-qing et al, A Comparative Study on the Splitting Tree Based Protocols for RFID Tag Identification, IEEE 2008, pp. 332-336.*
Jihoon Myung, Adaptive Binary Splitting for Efficient RFID Tag Anti-Collision, IEEE Communications Letters, vol. 10, No. 3, Mar. 2006, pp. 144-146.*
You-Chang Ko, Sumit Roy, Joshua R. Smith, Hyong-Woo Lee, Choong-Ho Cho, RFID MAC Performance Evaluation Based on ISO/IEC 18000-6 Type C, IEEE Communication Letters, Issue 6, pp. 426-428, Jun. 2008.
Jian-Cheng Huang, Toby Berger, Delay Analysis of Interval-Searching Contention Resolution Algorithms, IEEE Transactions on Information Theory, vol. 31, Issue 2, pp. 264-273, Mar. 1985.
Christian Floerkemeier, Transmission Control Scheme for Fast RFID Object Identification, Fourth Annual IEEE Pervasive Computing and Communications Workshops, PerCom Workshops 2006, Mar. 13-17, 2006.
Ko, You-Chang et al., An enhanced multiple-feedback algorithm for RFID MAC Protocols, ICC'09 IEEE International Conference on Communications, Jun. 14-18, 2009, pp. 1-6, Dresden.
Australian Patent Office, International Search Report and Written Opinion of the International Searching Authority for PCT/US10/39772, prepared on Sep. 23, 2010 and mailed on Oct. 6, 2010, Australia.
ISO/IEC 18000-6 International Standard, Information technology—Radio frequency identification for item management—Part 6: Parameters for air interface communications at 860 MHz to 960 MHz, Aug. 15, 2004.
ISO/IEC 18000-6 International Standard, Information technology—Radio frequency identification for item management—Part 6: Parameters for air interface communications at 860 MHz to 960 MHz, Dec. 1, 2010.

* cited by examiner

*Primary Examiner* — Chi Pham
*Assistant Examiner* — Ahmed Elallam (57) ABSTRACT

Embodiments of the disclosure relate to method and apparatus for efficient wireless adaptive uplink protocols for communication networks.

23 Claims, 8 Drawing Sheets

700 A computer program product.

702 A signal bearing medium.

704 at least one of one or more instructions for formatting data for transmission in a first uplink slot, wherein the first uplink slot includes a first uplink data slot and a first voting field with a plurality of first voting minislots, and wherein the formatted data includes transmission data formatted for the uplink data slot and a vote formatted for a randomly selected one of the plurality of first voting minislots;

one or more instructions for transmitting the formatted data at a first time associated with the first uplink slot;

one or more instructions for receiving a parameter array including indications for each of the plurality of first voting minislots, wherein each indication corresponds to one of no signal, one signal, or multiple signals;

one or more instructions for performing a slot splitting based at least in part on the received parameter array to provide a second uplink slot having a second uplink data slot;

one or more instructions for formatting the transmission data for transmission in the second uplink data slot;

one or more instructions for transmitting the transmission data at a second time associated with the second uplink slot;

one or more instructions for receiving data in an uplink slot, wherein the uplink slot includes an uplink data slot and a voting field with a plurality of voting fields;

one or more instructions for generating a parameter array including indications for each of the plurality of voting minislots, wherein each indication corresponds to one of no signal, one signal, or multiple signals; or one or more instructions for transmitting the parameter array to the communication network for reception by at least one wireless device.

| 706 a computer-readable medium. | 708 a recordable medium. | 710 a communications medium. |

ADAPTIVE UPLINK PROTOCOL

BACKGROUND

1. Technical Field

The present disclosure relates generally to network communications and, more specifically, to an adaptive uplink protocol.

2. Background

In network communications, clients may uplink data to a centralized hub. During uplink, collisions may occur as various clients attempt to uplink at the same time, and those collisions may cause transmitted data not to be successfully read at the hub. Collisions may be avoided or reduced by implementing anti-collision schemes, such as, for example, a tree walking algorithm. However, such schemes may increase system overhead and the delay in acquiring uplink data may remain a system bottleneck. Therefore, it may be desirable to provide efficient uplink protocols to reduce collisions while reducing system overhead.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 illustrates an example computer program product; and

DETAILED DESCRIPTION

The following description sets forth various examples along with specific details to provide a thorough understanding of claimed subject matter. It will be understood by those skilled in the art, however, that the claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn, inter alia, to methods, apparatus, computer programs, and systems related to adaptive uplink protocols for communication networks.

In the following description, algorithms and/or symbolic representations of operations on data bits and/or binary digital signals stored within a computing system, such as within a computer and/or computing system memory may be presented. An algorithm may generally be considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, parameters, numerals, etc. Those skilled in the art in light of the present disclosure will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a wireless node or hub, that manipulates and/or transforms data represented as physical quantities including electronic and/or magnetic quantities within the computing platform's processors, memories, registers, etc.

In some embodiments, adaptive uplink protocols implemented in a communication network may be provided. The protocols may be implemented by a hub and nodes that may be arranged in communication with one another. The hub may be adapted to receive uplink frames that may include a plurality of uplink slots. The uplink slots may be separated by guard time spaces and may include uplink data slots and voting fields. The voting fields may include a plurality of voting minislots. After an initiation, such as a downlink query session or the like, the nodes may be arranged to uplink data formatted for the uplink frame architecture described by transmitting packets using the uplink data slots and by making a randomly generated vote in one of the voting minislots of the voting field at a time associated with the uplink slot.

The hub may be adapted to receive the uplink data and one or more collisions may occur between the uplink nodes. The hub may be arranged to use the information in the voting fields to generate feedback that may be transmitted to some or all of the nodes. In some examples, the feedback may include one or more feedback parameter arrays. A feedback parameter array may be a ternary tuple array including an array of parameters with each parameter indicating no signal, one signal or multiple signals at each of the voting field minislots.

The feedback parameter may be used at the receiving node or nodes to perform a slot splitting that may increase the number of uplink slots in subsequent uplink communication sessions and may increase the chances that a collision may be avoided in the subsequent session. In some examples, the slot splitting may be based at least in part on a slot splitting multiplier. In some embodiments, the feedback parameter may be provided per uplink slot. In other embodiments, the feedback parameter may be provided in batch at the end of a frame. The feedback architecture described may efficiently reduce collisions based on the amount of overhead used.

Figure 1:
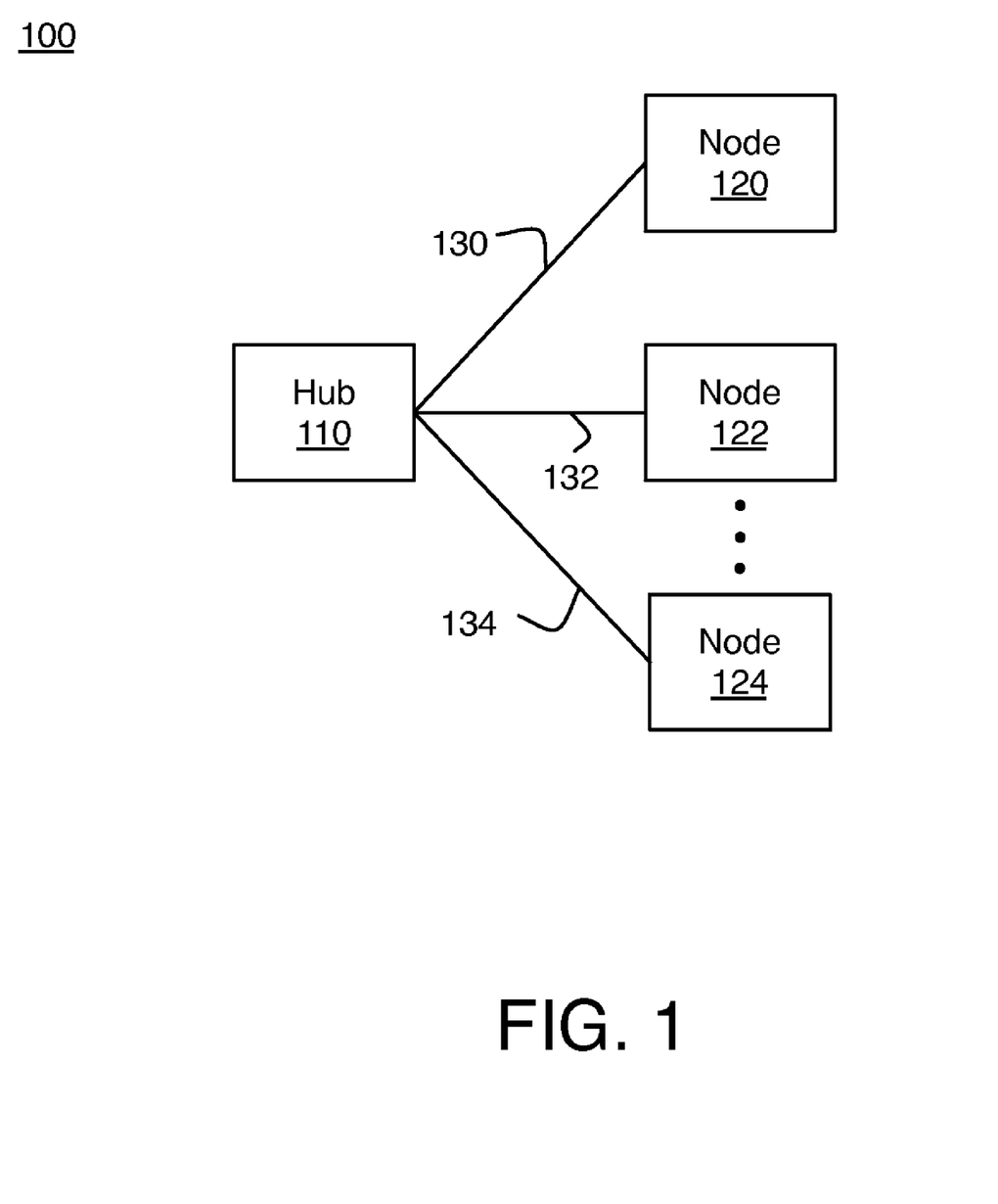
FIG. 1 illustrates an example communication network.

FIG. 1 illustrates an example communication network arranged in accordance with at least some embodiments of the present disclosure. As illustrated in FIG. 1, a communication network 100 may include a hub 110, nodes 120, 122, 124 and communication links 130, 132, 134. As illustrated, communication network 100 may be a star topology network. In general, the nodes may be configured to uplink information to hub 110 and hub 110 may be configured to downlink information to any combination of nodes. In some examples, the nodes may be clients and the hub may be a server configured to host the client nodes. Although only several nodes are shown, nearly any number of nodes may be provided as part of communication network 100. In some examples, communication network 100 may be a local area network (LAN) or a wireless local area network (WLAN) and hub 110 may be considered a centralized hub. In some examples, the hub and nodes may be configured to communicate using a time division multiple access (TDMA) channel access method.

In some embodiments, the nodes and hub 110 may be arranged to transmit data over a radio frequency link and the network may be adapted to support radio frequency identification (RFID). In various examples, the nodes may be RFID tags (passive, active, or semi-active) or sensors, and in various applications the communication network may be adapted for product tracking, inventory tracking, libraries, museums, retailing, environmental or ambient sensing (i.e., temperature, pressure, air quality, or the like), or any application where data from a variety of sources may be collected at a hub. In some examples, communication network 100 may be a sensor network. In various examples, the communication links may have a relatively short physical distance or range and communication network 100 may cover a room or several rooms. In some examples, the nodes may be arranged to operate with a relatively low power. In an example, hub 110 may be a computer or server configured to act as a host for the transmission of messages and may control uplink access by assigning time slots to nodes. Although only one hub is shown in FIG. 1, in some applications, multiple hubs may be used.

Figure 2:
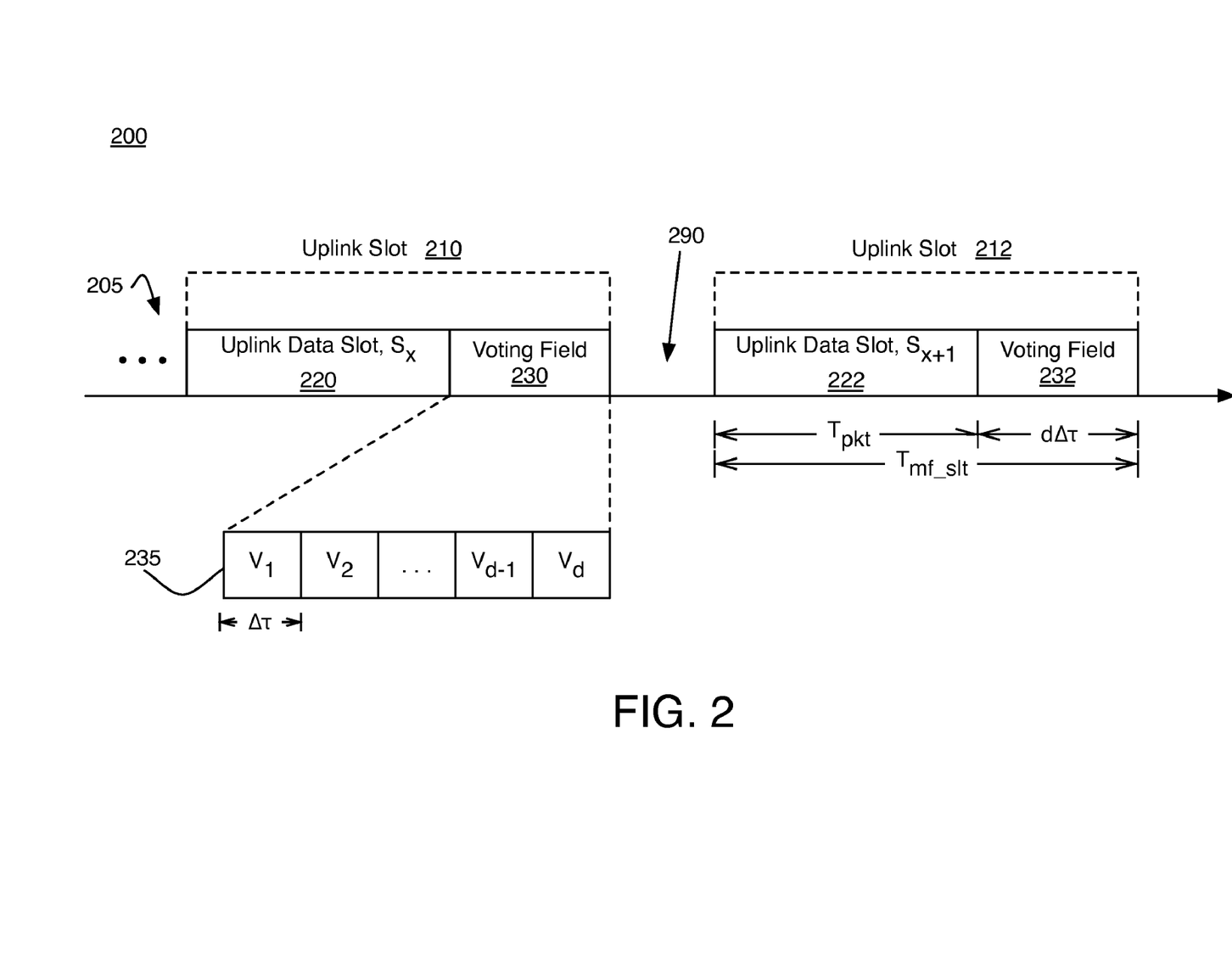
FIG. 2 illustrates an example uplink slot structure.

As discussed, nodes 120, 122, 124 may transmit, communicate or uplink data to hub 110. FIG. 2 illustrates an example uplink time slot structure arranged in accordance with at least some embodiments of the present disclosure. As illustrated in FIG. 2, an uplink structure 200 may include an uplink frame 205, which may include uplink slots 210, 212 separated by guard time space 290. Only a portion of one frame is shown for the sake of clarity, but many frames in sequence may be used. Uplink slots 210, 212 may include uplink data slots 220, 222 (for example, uplink data slots $S_x$ and $S_{x+1}$) and voting fields 230, 232. Data formatted for the uplink data slots may include transmission data. The voting fields may include a plurality of voting minislots, as illustrated with respect to voting field 230 by voting minislots 235. Voting field 232 may include similar voting slots, which are not shown in FIG. 2 for the sake of clarity. The voting minislots may be fields where a node may vote during data uplink. That is, data formatted for uplink may include a vote formatted for a randomly selected voting minislot. The node transferring data in an uplink data slot may make one vote to a randomly selected minislot, for example. The formatted data, including transmission data and a vote or voting data, may be uplinked from a node at a time associated with the uplink slot.

The voting minislots may be labeled $v_1, v_2, \ldots v_{d-1}, v_d$, and may include d voting minislots. Each voting minislot may be of a duration of $\Delta\tau$ and the voting field may be of a duration of $d\Delta\tau$. The duration of the uplink data slots may be given by $T_{pkt}$ and the duration of the uplink time may be given by $T_{mf\_slt}$. The uplink structure discussed here and the protocols discussed below may, for example, be implemented in a Media Access Control (MAC) data communication protocol sublayer.

Figure 3:
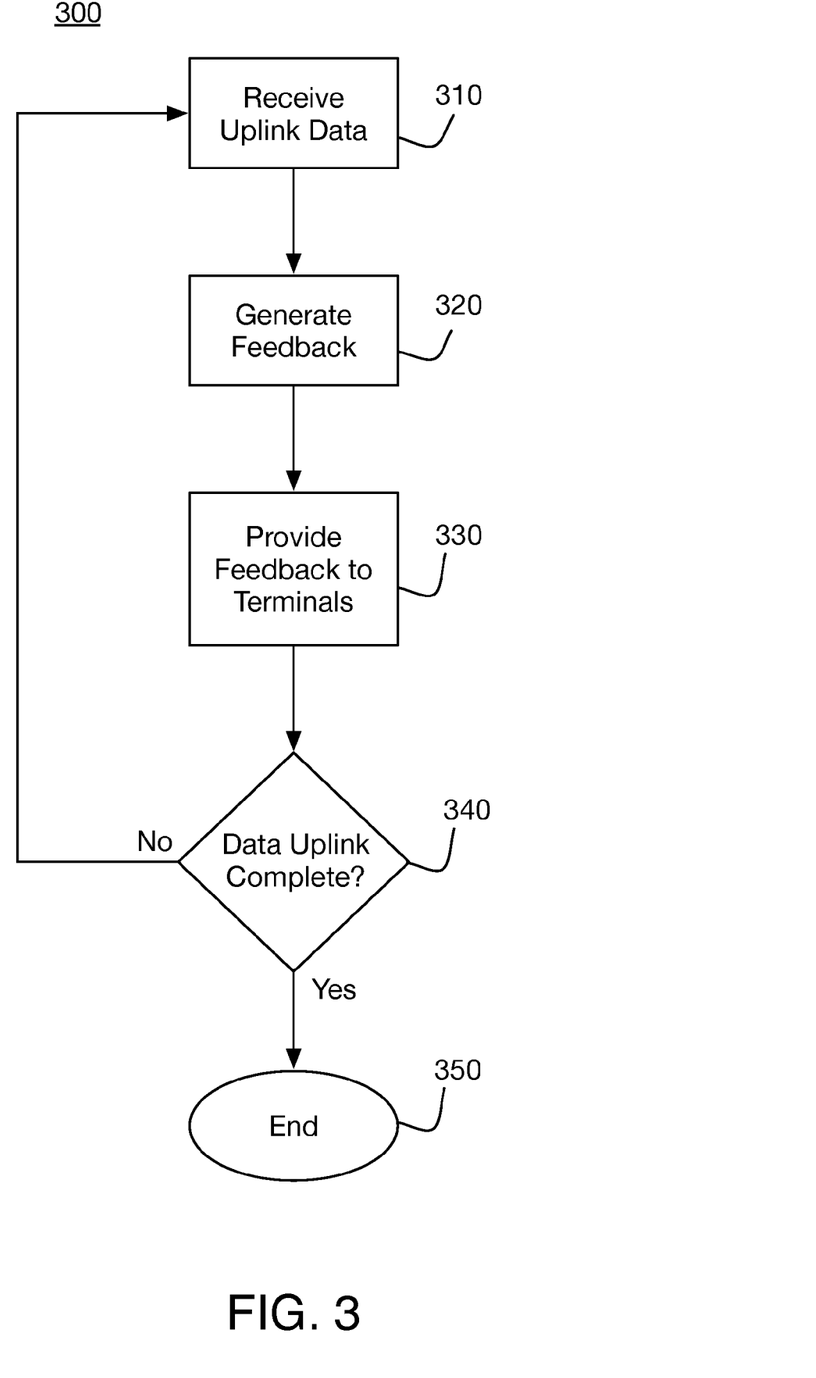
FIG. 3 illustrates an example method for providing feedback in a communication system.

FIG. 3 illustrates an example method for providing feedback in a communication system arranged in accordance with at least some embodiments of the present disclosure. As illustrated in FIG. 3, a method 300 may be arranged to provide feedback in the communication system and may be performed at hub 110, for example. Method 300 may include one or more functional operations or actions as illustrated by blocks 310, 320, 330, 340 and/or 350.

At block 310, uplink data having a structure as described with respect to FIG. 2, for example, may be received at a hub or server. In an example, the data may be received from one or more nodes as part of an uplink communication. In some examples, a burst of data may occur as many nodes communicate simultaneously. Such examples may occur upon a triggering event, such as detection of a temperature change or an inventory arrival, or the like. Triggering events may include a variety of events and what causes a triggering event may be based on the implementation environment of the communication system. For example, an arrival of books to be shelved may be a triggering event in a library. In some examples, nodes may be arranged to send data in response to a request from the hub. In other examples, the nodes may push data to the hub without a request from the hub. Processing may continue from block 310 to block 320. In some examples, uplink data transmission may be initiated by the nodes. In other examples, uplink data transmission may be initiated by a hub. In some examples, uplink data transmission may be initiated by a hub's regular polling request.

At block 320, feedback, such as a feedback parameter array or a series of feedback parameter arrays may be generated by a hub. The feedback may provide for improved uplink channel utilization by the nodes in subsequent uplink communications, for example by dynamically adjusting an uplink frame size at the nodes. The feedback may be based at least in part on the received uplink data. In some examples, the feedback parameter may be a parameter array including parameters that are an aggregate of the voting result from each of the voting minislots. In various examples, the feedback parameters may convey information indicating one of three types. A first type of information may indicate that no signal arrives at the voting minislot. A second type of information may indicate that only one signal arrives at the voting minislot. A third type of information may indicate that more than one signal arrives at the voting minislot. In another example, the feedback may include a series of feedback parameter arrays, which may be characterized as a feedback train, including information indicating one or more of the three types of information discussed above for the voting fields. Processing may continue from block 320 to block 330.

At block 330, hub 110 may be arranged to provide or transmit feedback to the nodes. In some embodiments, the feedback may be transmitted by the hub 110 over a wireless link at the end of each frame or on a per slot basis. The feedback may be transmitted by hub 110 to all of the nodes or some of the nodes or a single node. The feedback may include the feedback parameter array or series of arrays and the feedback may be used for slot splitting at the nodes, as is discussed further below. Processing may continue from block 330 to block 340.

At block 340, hub 110 may be arranged to determine if data uplink is complete. If the data uplink is determined to be complete, then processing may continue from block 340 to block 350 where the method 300 may end. If the data uplink is determined to be incomplete, then processing may continue from block 340 to block 310, where the method 300 may continue to block 310 such that additional uplink data may be received and processed by hub 110. Any number of cycles of data uplink, feedback generation and feedback transmission may be provided to complete data uplink. The cycles may be characterized as communication sessions.

In some embodiments, the feedback generated by hub 110 at block 320 and transmitted by hub 110 at block 330 may include a feedback parameter array including information or indications aggregating voting results from voting minislots of uplink slots transmitted to a hub from nodes (please refer to FIG. 2). In some examples, a feedback parameter array may be represented by the designation W that may include an array, $\{W_1, W_2, \ldots, W_{d-1}, W_d\}$, with each element of the array determined based at least on the following criteria:

$$W_i = \begin{cases} 0 \text{ (Empty), when no signal arrives at } v_i, \\ 1 \text{ (Possible Success), when only one signal arrives at } v_i, \text{ and} \\ 2 \text{ (Collision), when more than one signal arrives at } v_i, \end{cases} \quad (1)$$

for i=1, 2, ..., d−1, d (please refer to FIG. 2). Using equation (1), $W_i$ may be determined such that a value of 0 may represent an empty (or no signal at voting minislot $v_i$), a value of 1 may represent only one signal at voting slot $v_i$ and may represent a possibly successful data transmission, and a value of 2 may represent a collision and more than one signal at voting slot $v_i$. Although values of 0, 1 and 2 are used as an example, any suitable values may be used as indications. As discussed above, d may correspond to the number of voting minislots in a voting field. In an example, the feedback parameter array may be considered a ternary d-tuple array for slot feedback. In various examples, the feedback parameter array may be provided on a per slot basis.

In another embodiment, the feedback may be provided on a per frame basis. For such a configuration, the feedback may include a feedback train of several feedback parameter arrays. In an example, the feedback may be represented by the series of arrays, $\{(W_1, W_2, \ldots, W_d)_1, (W_1, W_2, \ldots, W_d)_2, \ldots, (W_1, W_2, \ldots, W_d)_f\}_r$, such that r indicates a frame number, d indicates the number of voting minislots, as above, and f indicates the number of slots in a frame. The feedback arrays in the feedback train may be formed as discussed above and as shown in equation (1).

The feedback provided and transmitted by the hub 110 may be used by some or all of the nodes (120, 122, 124) to implement a slot splitting. The nodes may each be configured to implement slot splitting and individual nodes may be arranged to determine a slot in a subsequent uplink communication frame for data transmission or retransmission.

Figure 4:
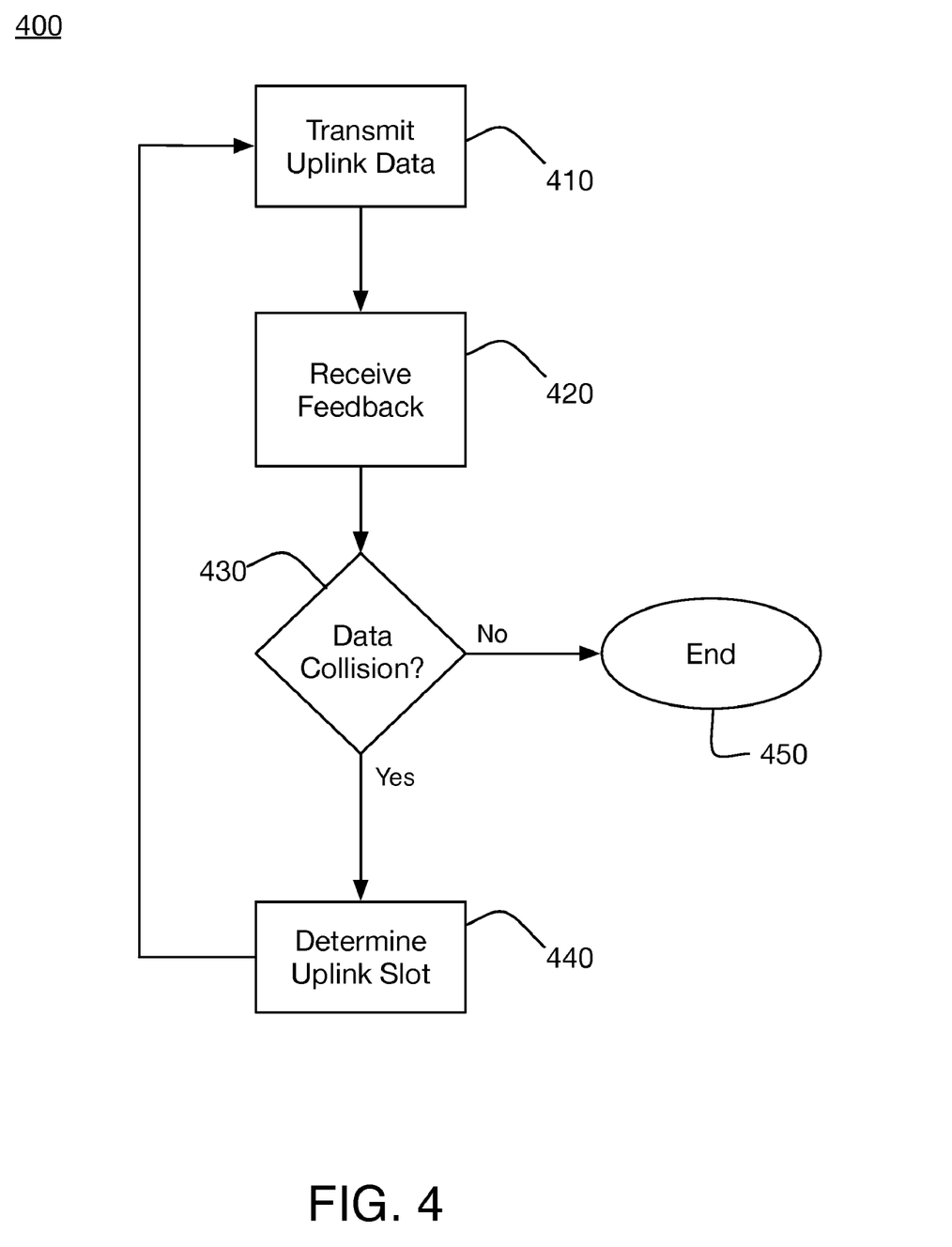
FIG. 4 illustrates an example method for data uplink.

FIG. 4 illustrates an example method for data uplink arranged in accordance with at least some embodiments of the present disclosure. As illustrated in FIG. 4, a method 400 may provide a protocol for data uplink and may be performed at a node. Method 400 may include one or more functional operations or actions as illustrated by blocks 410, 420, 430, 440 and/or 450.

At block 410, a node may be arranged to transmit or uplink data. In an example, the uplink slot may have an architecture or structure as described with reference to FIG. 2. The uplink may be performed in any network and any manner as discussed herein. The uplink may be performed at a time associated with an uplink slot. Processing may continue from block 410 to block 420.

At block 420, a node may be arranged to receive feedback, for example from a hub or a host. The feedback may include a feedback parameter array or a series of feedback parameter arrays as discussed above. Processing may continue from block 420 to block 430.

At block 430, the node may be arranged to use the feedback to determine whether the uploaded data was transmitted successfully or unsuccessfully such that the data collided. If the transmission (or retransmission) of the data was determined to be successful (i.e. without a data collision), then processing may continue from block 430 to block 450, where the node may end processing at block 450 and no additional transmissions may be made. In an example, if the data was successfully transmitted, the node may disable data transmission in subsequent uplink communication frames. If the transmission of the data was determined to be unsuccessful (i.e., with a data collision), then processing may continue from block 430 to block 440, where the node may determine a slot splitting and an uplink slot to use based at least in part on the feedback received at block 420, and processing may continue from block 440 to block 410, where the node may retransmit the uplink data in another uplink communication frame. In some examples, the slot splitting may be based at least in part on a received slot splitting multiplier, as is further discussed below. In an example, the slot splitting may be part of an adaptive uplink protocol for collision avoidance.

As discussed, in an embodiment, the feedback may include a feedback parameter array (for example, array W, as discussed) that may be provided on a per slot basis. The feedback parameter array may be used by nodes to effect a dynamic slot splitting for subsequent uplink communication frames. In some embodiments, a feedback parameter may be used to determine whether uplink data collided (at block 430). Using a received feedback parameter array as discussed with respect to equation (1), a node may determine whether a data collision has occurred for uplink data using a collision function such that if $$\sum_{i=1}^{d} W_i > 1 \quad (2)$$

then the uplink slot may be determined to be collided. In general, if the feedback parameter array and the collision function indicate multiple nodes uplinked in an individual uplink slot, the uplink slot may be determined to be collided. If the feedback parameter array and the collision function indicate multiple nodes did not uplink in an individual uplink slot, the uplink slot may be determined to have been not collided (i.e., successfully transmitted).

If no collision occurred, the data may have been successfully transmitted and received and the communication protocol may end at block 450. In such an example, the node may disable data transmission subsequent uplink communication frame. If a collision occurred, a slot splitting may be determined (at block 440).

Figure 5:
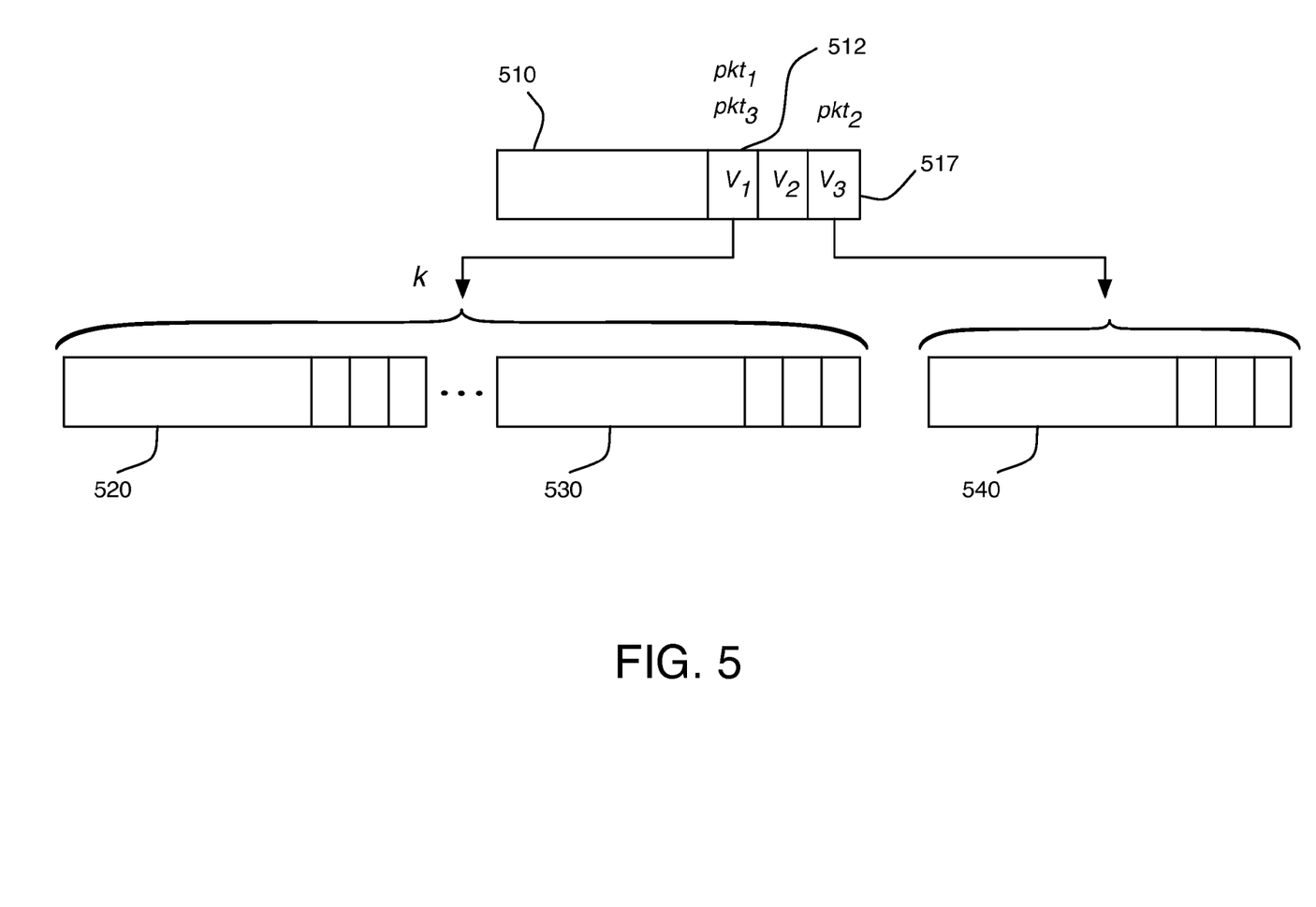
FIG. 5 illustrates an example slot splitting protocol.

FIG. 5 illustrates an example slot splitting protocol arranged in accordance with at least some embodiments of the present disclosure. Suppose, for example, three packets $pkt_1$, $pkt_2$ and $pkt_3$ arrived at uplink slot 510 having three voting minislots with voting minislots chosen (randomly) such that packets $pkt_1$ and packet $pkt_3$ voted in minislot 512, referred to here as $v_1$, and packet $pkt_2$ used minislot 517, referred to here as $v_3$. In such an example, the hub may be configured to provide a feedback parameter array, W, of {2, 0, 1} using equation (1) above. Based on the parameter in voting slot $v_3$ (a value of 1), a single uplink slot 540 may be provided in the next uplink communication frame corresponding to pkt$_2$. Based on the parameter in voting slot v$_1$, however, multiple uplink slots (shown as uplink slots 520, 530) may be provided in the next uplink communication session. In some examples, the number of uplink slots may be based at least in part on a slot splitting multiplier, k.

The node that transmitted pkt$_2$ may use uplink slot 540 in a subsequent uplink communication session. The nodes that transmitted packets pkt$_1$ and pkt$_3$ may use uplink slot 520 or uplink slot 530 in a subsequent uplink communication frame. Nodes having a collided data uplink may return to block 410 for data uplink and the protocol as discussed may be repeated. In an example, the protocol may be repeated until data uplink may be complete.

As discussed, the number of additional uplink slots provided in subsequent uplink communication frames for those voting minislots with multiple votes may be based at least in part on a slot splitting multiplier. The multiplier (k in the example) may be defined based on various system parameters including, for example, the number of expected nodes, the data uplink rate, and the like. Slot splitting may provide an increased chance that packet collisions may not occur in subsequent uplink communication frames. In the illustrated example, a multiplier of 2 was used, however any suitable multiplier may be used. In some examples, a multiplier of between about 2 and 10 may be used. In various examples, the value of the multiplier may be based at least in part on the number of expected communicating nodes in the network, the data uplink rate, or the like.

Although the given example includes three voting minislots for the sake of clarity, any number of voting minislots may be utilized. In various examples from 2 to 100 voting minislots may be used. The number of minislots used may be based at least in part on system parameters such as the number of expected communicating nodes, the data uplink rate, and the like. In particular, the number of voting minislots may determine the size of the voting field and its duration, which may be considered system overhead. Therefore, a larger number of voting minislots may advantageously provide additional feedback information and more accurate slot splitting but may disadvantageously use system bandwidth for overhead, which may be more efficiently used for data transfer.

In some embodiments and as discussed above with respect to FIG. 3 and FIG. 4, the feedback may be provided at block 330 and received at block 420 on a per frame basis and it may be broadcast in batch at the end of a frame time. The feedback may include a series of feedback parameter arrays. In some examples, the series of feedback parameter arrays may be considered a feedback train. In an example and as discussed above the feedback provided on a per frame basis may be represented as: {(W$_1$, W$_2$, . . . , W$_d$)$_1$, (W$_1$, W$_2$, . . . , W$_d$)$_2$, . . . , (W$_1$, W$_2$, . . . , W$_d$)$_{f_r}$}.

Using a feedback train, for example, a node may be configured to determine whether a data collision has occurred (please refer to block 430 of FIG. 4) using a collision function. For example, a node that transmitted a packet to the x-th slot (1≤x≤f) of the r-th frame may check the slot status via the following collision decision function:

$$C_{x,r} = \begin{cases} 0, & \text{if } \sum_{j=1}^{d} W_{j,x,r} < 2 \\ 1, & \text{otherwise} \end{cases} \quad (3)$$

such that if C$_{x,r}$=0, the node may have successfully transmitted the packet and if C$_{x,r}$=1, a collision may have occurred and the node may need to identify a retransmission time in the (r+1)-th frame.

If it is determined that no collision occurred, the data may have been successfully transmitted and received and the communication protocol may end (at block 450). If it is determined that a collision occurred, the node may determine a retransmission time or an uplink slot for the data based at least in part on the information provided in the feedback parameter arrays. In an example, the number of success minislots, s, and the number of collision minislots, c, up to the minislot v$_i$, for a collided slot S$_x$ in frame f$_r$ may be defined as follows:

$$\begin{cases} s_{i,x,r} = \sum_{j=1}^{i} W_{j,x,r} \text{ such that } W_{j,x,r} = 1 \\ c_{i,x,r} = \sum_{j=1}^{i} W_{j,x,r} \text{ such that } W_{j,x,r} = 2 \end{cases} \quad (4)$$

such that j may be a counter index variable, i (1≤i≤d) may represent the voting minislot number chosen by a node, x (1≤x≤f) may represent the slot number chosen by a node, r may represent a frame number, and W may represent a feedback parameter, as previously discussed.

Using the number of success and collision minislots, a splitting size and an updated frame size may be determined. In an example, the splitting size may be based at least in part on the number of collision and success minislots. In an example, the splitting size may be the number of collision minislots multiplied by a slot splitting multiplier added to the number of success minislots. In an example, the updated frame size may be based at least in part on the splitting sizes. In an example, the updated frame size may be a summation of the splitting sizes.

In an example, the values determined in equation (4) may be used to determine a splitting size (m$_{x,r}$) for slot S$_x$ of the r-th frame and the updated frame size, f$_{r+1}$ for the (r+1)-th frame using the following:

$$\begin{cases} m_{x,r} = s_{d,x,r} + kc_{d,x,r} \\ f_{r+1} = \sum_{x=1}^{f_r} m_{x,r} \end{cases} \quad (5)$$

where k represents a slot splitting multiplier.

A node may be arranged to determine a transmission time to retransmit the data (at block 440) based at least in part on the splitting size and the updated frame size. In some examples, a node may determine the transmission time by choosing randomly between at least two retransmission time options. In various examples, the retransmission time (R) for the (r+1)-th frame with the chosen minislot number i in the chosen slot number x by a node in r-th frame may be given by the following expression:

$$R_{i,x,r} = \begin{cases} \sum_{j=1}^{x-1} m_{j,r} + s_{i,x,r} + kc_{i,x,r}, \text{ for } W_{i,x,r} = 1 \\ rand\left[\sum_{j=1}^{x-1} m_{j,r} + s_{i,x,r} + k(c_{i,x,r} - 1) + 1, \sum_{j=1}^{x-1} m_{j,r} + s_{i,x,r} + kc_{i,x,r}\right], \\ \text{ for } W_{i,x,r} = 2 \end{cases} \quad (6)$$

where i ($1 \leq i \leq d$) may represent the voting minislot number chosen by a node, j may be a counter index variable, x ($1 \leq x \leq f$) may represent the slot number chosen by a node, r may represent a frame number, m may represent a splitting size, s may represent success minislots, c may represent collision minislots, W may represent a feedback, k may represent a slot splitting multiplier, as discussed, and rand[A,B] may choose a random number between A and B inclusive.

As discussed, the nodes that were determined to have a collision based at least in part on equation (3) may determine a retransmission time or uplink slot and they may participate in a subsequent uplink communication frame. Referring to FIG. 4, those nodes may return to block 410 of the method for an uplink communications frame and the communication protocol may repeat as necessary. In an example, the communication protocol may be repeated until data uplink may be complete.

As discussed, in some examples, the nodes may determine whether a collision occurred, a slot splitting and a retransmission time. In other examples, the hub may determine whether a collision occurred, a slot splitting and a retransmission time for the nodes, and that information may be provided to the nodes as feedback. For example, such feedback may be provided at block 330 in FIG. 3.

As described, an adaptive uplink communication protocol may result in increased network efficiency by reducing collisions while maintaining a relatively low amount of system overhead for voting fields. To optimize efficiency in the network, trade-offs may need to be made. In general, uplink efficiency may be considered as the ratio of successful uplink time to total uplink time. With reference to FIG. 2, in the uplink architecture described, the efficiency may be the ratio of the successful $T_{pkt}$ times to total $T_{mf\_slt}$ times during a session. In an example, the efficiency may be determined based at least in part on:

$$\rho_{UL} = \frac{nT_{pkt}}{N(n)T_{m\_slt}} = \frac{n}{N(n)(1+d\gamma)} \quad (7)$$

where $\rho_{UL}$ may represent the uplink efficiency, n may represent the number of packets transmitted by nodes 120 to 124 in FIG. 1 to a time slot, $T_{pkt}$ may represent the duration of the uplink slot, N(n) may represent the number of additional uplink time slots required to resolve the n packet collisions, d may represent the number of voting fields, and γ may represent the ratio of minislot length to packet length ($\Delta\tau/T_{pkt}$). Using equation (7), the parameters of the communications network may be determined to maximize uplink efficiency.

Turning now to embodiments that may perform any of the methods or protocols as discussed above, FIG. 6 illustrates an example device 600 for wireless communications arranged in accordance with at least some embodiments of the present disclosure. Device 600 may be used to perform some or all of the various functions discussed above in connection with FIG. 3 and/or FIG. 4. Device 600 may include any device or collection of devices capable of wireless communications in a network. For example, device 600 may include selected components of a wireless base station, a mobile platform such as a mobile computer, a wireless node, a sensor node of a sensor network, etc., although claimed subject matter is not limited in this regard.

Figure 6:
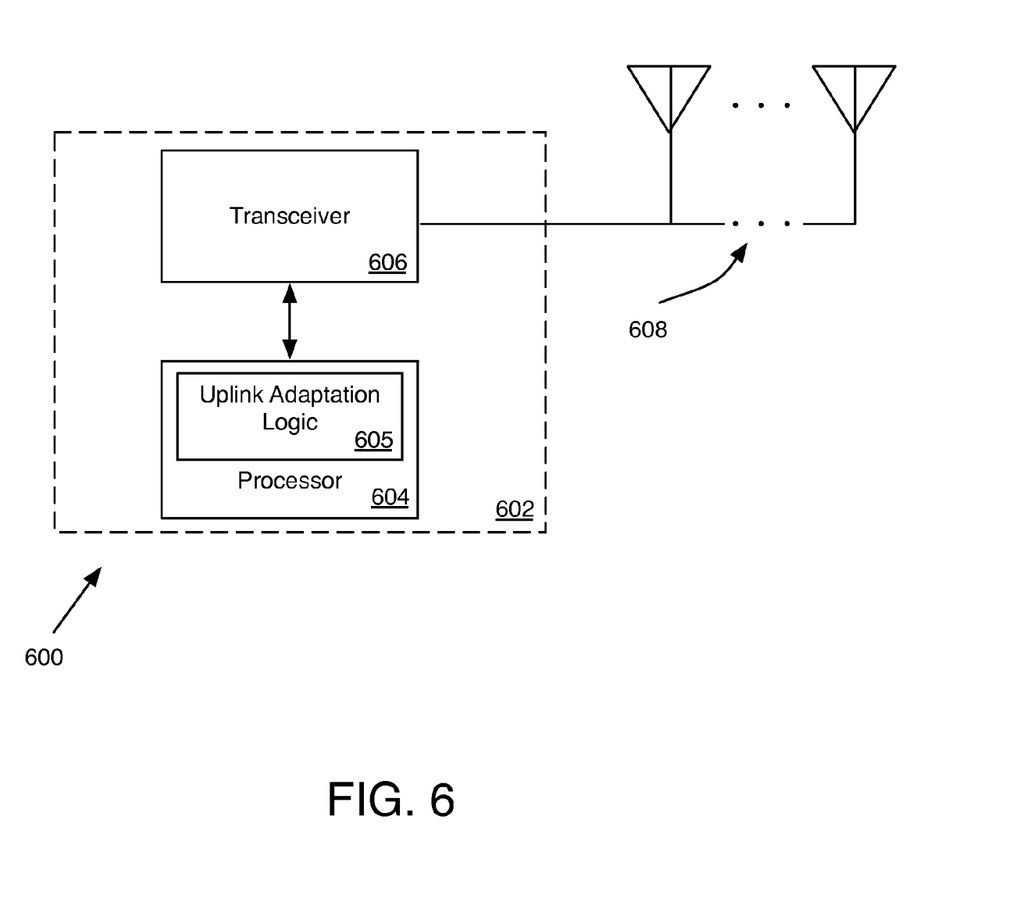
FIG. 6 illustrates an example device for wireless communication.

In some examples, device 600 may include a wireless node 602 having a processor 604, an RF transceiver 606 and one or more antennas 608. Node 602 may include uplink adaptation logic 605 that may be configured to undertake various methods, functional operations, actions, and/or blocks such as those described previously for FIG. 3 and/or FIG. 4. Further, node 602 may include additional items such as memory, a router, network interface logic, etc. Uplink adaptation logic 605 may be configured to provide any of the functionality described herein and claimed subject matter is not limited to specific types or manifestations of processing logic. For example, processor 604 may be a microprocessor or Central Processing Unit (CPU). In other implementations, processor 604 may be an Application Specific Integrated Circuit (ASIC), a Field Programmable Gate Array (FPGA), a digital signal processor (DSP), or other integrated formats. Further, antennas 608 may be any suitable antennas including but not limited to loop, dish, parabolic, panel, sector, directional, omnidirectional, etc. While an RF transceiver 606 is illustrated in FIG. 6, claimed subject matter is not limited in this regard and node 602 may, for example, employ a separate RF receiver circuit and RF transmitter circuit.

FIG. 7 illustrates an example computer program product 700 arranged in accordance with at least some embodiments of the present disclosure. Program product 700 may include a signal bearing medium 702. Signal bearing medium 702 may include one or more instructions 704 that, when executed by, for example, a processor, may provide the functionality described above with respect to FIG. 3 and/or FIG. 4 and the related disclosure. Thus, for example, a processor may undertake one or more of the blocks shown in FIG. 3 and/or FIG. 4 in response to instructions 704 conveyed by medium 702.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be wirelessly conveyed by signal bearing medium 702, where signal bearing medium 702 is conveyed to an implementing device by a wireless communications medium 710 (e.g., an wireless communications medium conforming with the 802.11 standard).

Figure 8:
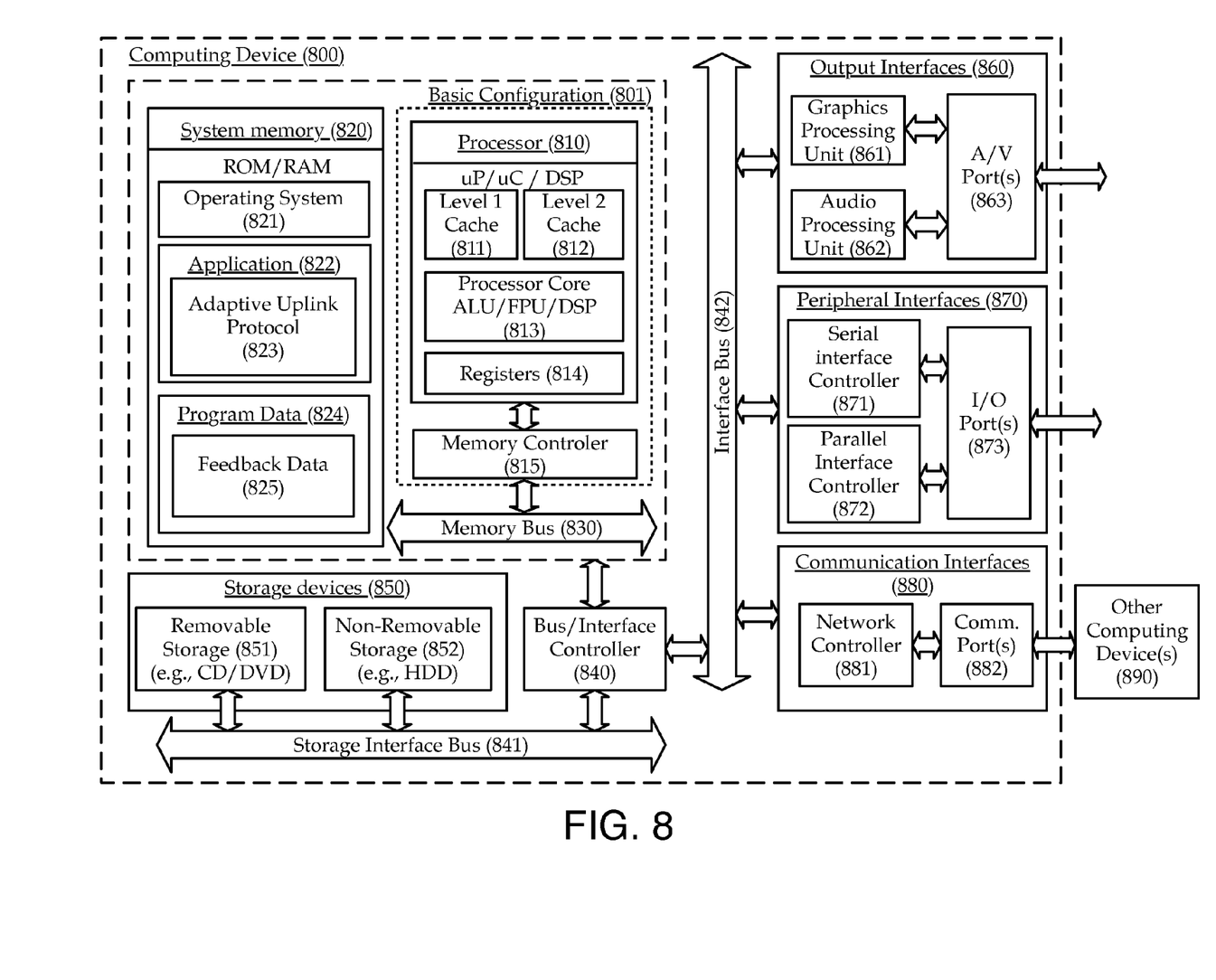
FIG. 8 is a block diagram illustrating an example computing device, all arranged in accordance with at least some embodiments of the present disclosure.

FIG. 8 is a block diagram illustrating an example computing device 800 arranged for adaptive uplink protocols in accordance with at least some embodiments of the present disclosure. In a basic configuration 801, computing device 800 may include one or more processors 810 and system memory 820. A memory bus 830 may be used for communicating between processor 810 and system memory 820.

Depending on the configuration, processor 810 may be of any type including, but not limited to, a microprocessor (μP), a microcontroller (μC), a digital signal processor (DSP), or any combination thereof. Processor 810 may include one or more levels of caching, such as a level one cache 811 and a level two cache 812, a processor core 813, and registers 814. The processor core 813 may include an arithmetic logic unit (ALU), a floating point unit (FPU), a digital signal processing core (DSP Core), or any combination thereof. A memory controller 815 may be used with processor 810, or memory controller 815 may be an internal part of the processor 810.

Depending on the desired configuration, system memory 820 may be of any type including, but not limited to, volatile memory (such as RAM), non-volatile memory (such as ROM, flash memory, etc.) or any combination thereof. System memory 820 may include an operating system 821, one or more applications 822, and program data 824. Application 822 may include an adaptive uplink protocol 823 to perform functions described herein including, but not limited to, the methods, functional operations, actions or blocks described with respect to FIG. 3 and/or FIG. 4 and the associated disclosure. Program Data 824 may include feedback data 825 for use in adaptive uplink protocol 823, for example, data corresponding to feedback arrays or data corresponding to slot splitting. In some embodiments, application 822 may be arranged to operate with program data 824 on an operating system 821 such that implementations of improved adaptive uplink protocols may be provided as described herein. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. Data storage devices 850 may be removable storage devices 851, non-removable storage devices 852, or a combination thereof. Examples of removable storage and non-removable storage devices may include magnetic disk devices such as flexible disk drives and hard-disk drives (HDD), optical disk drives such as compact disk (CD) drives or digital versatile disk (DVD) drives, solid state drives (SSD), or tape drives, or the like. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may include an interface bus 842 for facilitating communication from various interface devices (e.g., output interfaces, peripheral interfaces, and communication interfaces) to basic configuration 801 via the bus/interface controller 840. Example output interfaces 860 include a graphics processing unit 861 and an audio processing unit 862, which may be configured to communicate to various external devices such as a display or speakers via one or more NV ports 863. Example peripheral interfaces 860 include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that may have one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) or other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may be implemented as a personal computer including both laptop computer and non-laptop computer configurations. In addition, computing device may be implemented as part of a wireless base station or other wireless system or device such as node 602 described above with respect to FIG. 6.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," "other implementations," "an example," "some examples," "various examples," or "other examples" may mean that a particular feature, structure, or characteristic described in connection with one or more implementations or examples may be included in at least some implementations or examples, but not necessarily in all implementations or examples. The various appearances of "an implementation," "one implementation," "some implementations," "an example," "some examples," "various examples," or "other examples" in the preceding description are not necessarily all referring to the same implementations or examples. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may be viewed as being "operably connected", or "operably coupled", to each other to achieve the desired functionality, and any two components capable of being so associated may be viewed as being "operably couplable", to each other to achieve the desired functionality. Specific examples of operably couplable include, but are not limited to, physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for a hub to provide feedback to wireless devices for data uplink communications in a communication network, the method for the hub comprising:
   receiving data in an uplink slot, wherein the uplink slot includes an uplink data slot and a voting field with a plurality of voting minislots;
   generating a parameter array including indications for each of the plurality of voting minislots, wherein each indication corresponds to one of no signal, one signal, or multiple signals;
   transmitting the parameter array to the communication network for reception by at least one wireless device; and
   transmitting a slot splitting multiplier to the communication network for reception by at least one wireless device.

2. The method of claim 1, wherein transmitting the parameter array comprises transmitting the parameter array at an end of the uplink slot or at an end of uplink frame.

3. The method of claim 1, wherein generating the parameter array comprises determining:

$$W_i = \begin{cases} 0 \text{ (Empty), when no signal arrives at } v_i, \\ 1 \text{ (Possible Success), when only one signal arrives at } v_i, \text{ and} \\ 2 \text{ (Collision), when more than one signal arrives at } v_i, \end{cases}$$

wherein W is the parameter array, i is an index variable and v is the voting minislot of the voting field.

4. The method of claim 1, further comprising:
   generating a second parameter array including second indications for each of a plurality of voting minislots of a second uplink slot, wherein each second indication corresponds to one of no signal, one signal or multiple signals; and
   transmitting the second parameter array to the communication network for reception by at least one wireless device.

5. The method of claim 4, wherein transmitting the parameter array and transmitting the second parameter array comprises transmitting at the end of a frame.

6. The method of claim 1, wherein the slot splitting multiplier is based at least in part on one of a number of nodes in the communication network and a data uplink rate.

7. An article comprising: a non-transitory computer readable medium having stored therein instructions that, if executed, result in:
   receiving data in an uplink slot, wherein the uplink slot includes an uplink data slot and a voting field with a plurality of voting minislots;
   generating a parameter array including indications for each of the plurality of voting minislots, wherein each indication corresponds to one of no signal, one signal, or multiple signals;
   transmitting the parameter array to a communication network for reception by at least one wireless device; and
   transmitting a slot splitting multiplier that is based at least in part on a data uplink rate to the communication network for reception by at least one wireless device.

8. The article of claim 7, wherein generating the parameter array comprises determining:

$$W_i = \begin{cases} 0 \text{ (Empty), when no signal arrives at } v_i, \\ 1 \text{ (Possible Success), when only one signal arrives at } v_i, \text{ and} \\ 2 \text{ (Collision), when more than one signal arrives at } v_i, \end{cases}$$

wherein W is the parameter array, i is a voting minislot number and v is the voting minislot of the voting field.

9. The article of claim 7, the computer program product having stored therein further instructions that, if executed, result in:
   generating a number of success minislots, s, and a number of collision minislots, c, by determining:

$$\begin{cases} s_{i,x,r} = \sum_{j=1}^{i} W_{j,x,r} \text{ such that } W_{j,x,r} = 1 \\ c_{i,x,r} = \sum_{j=1}^{i} W_{j,x,r} \text{ such that } W_{j,x,r} = 2 \end{cases}$$

wherein j is a counter index variable, i is a voting minislot number, x is a slot number, r is a frame number, and W is the parameter array.

10. The article of claim 9, the computer program product having stored therein further instructions that, if executed, result in:

generating a splitting size, m, and an updated frame size, f, by determining:

$$\begin{cases} m_{x,r} = s_{d,x,r} + kc_{d,x,r} \\ f_{r+1} = \sum_{x=1}^{f_r} m_{x,r} \end{cases}$$

wherein d is a total number of voting minislots and k is a slot splitting multiplier.

11. The article of claim 10, the computer program product having stored therein further instructions that, if executed, result in:

generating a retransmission time, R, by determining:

$$R_{i,x,r} = \begin{cases} \sum_{j=1}^{x-1} m_{j,r} + s_{i,x,r} + kc_{i,x,r}, \text{ for } W_{i,x,r} = 1 \\ rand\left[\sum_{j=1}^{x-1} m_{j,r} + s_{i,x,r} + k(c_{i,x,r} - 1) + 1, \sum_{j=1}^{x-1} m_{j,r} + s_{i,x,r} + kc_{i,x,r}\right], \\ \text{ for } W_{i,x,r} = 2 \end{cases}$$

wherein rand[A,B] chooses a random number between A and B, inclusive.

12. The article of claim 7, the computer program product having stored therein further instructions that, if executed, result in:

generating a second parameter array including second indications for each of a plurality of voting minislots of a second uplink slot, wherein each second indication corresponds to one of no signal, one signal or multiple signals; and transmitting the second parameter array to the communication network for reception by at least one wireless device.

13. A method for a hub to provide feedback to wireless devices for data uplink communications in a communication network, the method for the hub comprising:

receiving data in an uplink slot, wherein the uplink slot includes an uplink data slot and a voting field with a plurality of voting minislots;

generating a parameter array including indications for each of the plurality of voting minislots, wherein each indication corresponds to one of no signal, one signal, or multiple signals;

transmitting the parameter array to the communication network for reception by at least one wireless device;

generating a number of success minislots, s, and a number of collision minislots, c, by determining:

$$\begin{cases} s_{i,x,r} = \sum_{j=1}^{i} W_{j,x,r} \text{ such that } W_{j,x,r} = 1 \\ c_{i,x,r} = \sum_{j=1}^{i} W_{j,x,r} \text{ such that } W_{j,x,r} = 2 \end{cases}$$

wherein j is a counter index variable, i is a voting minislot number, x is a slot number, r is a frame number, and W is the parameter array; and generating a splitting size, m, and an updated frame size, f, by determining:

$$\begin{cases} m_{x,r} = s_{d,x,r} + kc_{d,x,r} \\ f_{r+1} = \sum_{x=1}^{f_r} m_{x,r} \end{cases}$$

wherein d is a total number of voting minislots and k is a slot splitting multiplier.

14. The method of claim 13, wherein transmitting the parameter array comprises transmitting the parameter array at an end of the uplink slot or at an end of uplink frame.

15. The method of claim 13, wherein generating the parameter array comprises determining:

$$W_i = \begin{cases} 0 \text{ (Empty)}, & \text{when no signal arrives at } v_i, \\ 1 \text{ (Possible Success)}, & \text{when only one signal arrives at } v_i, \text{ and} \\ 2 \text{ (Collision)}, & \text{when more than one signal arrives at } v_i, \end{cases}$$

wherein W is the parameter array, i is an index variable and v is the voting minislot of the voting field.

16. The method of claim 13, further comprising:

generating a second parameter array including second indications for each of a plurality of voting minislots of a second uplink slot, wherein each second indication corresponds to one of no signal, one signal or multiple signals; and transmitting the second parameter array to the communication network for reception by at least one wireless device.

17. The method of claim 16, wherein transmitting the parameter array and transmitting the second parameter array comprises transmitting at the end of a frame.

18. The method of claim 13, further comprising:

transmitting a slot splitting multiplier to the communication network for reception by at least one wireless device.

19. The method of claim 18, wherein the slot splitting multiplier is based at least in part on one of a number of nodes in the communication network and a data uplink rate.

20. An article comprising: a non-transitory computer readable medium having stored therein instructions that, if executed, result in:

receiving data in an uplink slot, wherein the uplink slot includes an uplink data slot and a voting field with a plurality of voting minislots;

generating a parameter array including indications for each of the plurality of voting minislots, wherein each indication corresponds to one of no signal, one signal, or multiple signals;

transmitting the parameter array to a communication network for reception by at least one wireless device;
generating a number of success minislots, s, and a number of collision minislots, c, by determining:

$$\begin{cases} s_{i,x,r} = \sum_{j=1}^{i} W_{j,x,r} \text{ such that } W_{j,x,r} = 1 \\ c_{i,x,r} = \sum_{j=1}^{i} W_{j,x,r} \text{ such that } W_{j,x,r} = 2 \end{cases}$$

wherein j is a counter index variable, i is a voting minislot number, x is a slot number, r is a frame number, and W is the parameter array; and
generating a splitting size, m, and an updated frame size, f, by determining:

$$\begin{cases} m_{x,r} = s_{d,x,r} + kc_{d,x,r} \\ f_{r+1} = \sum_{x=1}^{f_r} m_{x,r} \end{cases}$$

wherein d is a total number of voting minislots and k is a slot splitting multiplier.

21. The article of claim 20, wherein generating the parameter array comprises determining:

$$W_i = \begin{cases} 0 \text{ (Empty), when no signal arrives at } v_i, \\ 1 \text{ (Possible Success), when only one signal arrives at } v_i, \text{ and} \\ 2 \text{ (Collision), when more than one signal arrives at } v_i, \end{cases}$$

wherein W is the parameter array, i is a voting minislot number and v is the voting minislot of the voting field.

22. The article of claim 20, the computer program product having stored therein further instructions that, if executed, result in:
generating a retransmission time, R, by determining:

$$R_{i,x,r} = \begin{cases} \sum_{j=1}^{x-1} m_{j,r} + s_{i,x,r} + kc_{i,x,r}, \text{ for } W_{i,x,r} = 1 \\ rand\left[\sum_{j=1}^{x-1} m_{j,r} + s_{i,x,r} + k(c_{i,x,r} - 1) + 1, \sum_{j=1}^{x-1} m_{j,r} + s_{i,x,r} + kc_{i,x,r}\right], \\ \text{for } W_{i,x,r} = 2 \end{cases}$$

wherein rand[A,B] chooses a random number between A and B, inclusive.

23. The article of claim 20, the computer program product having stored therein further instructions that, if executed, result in:
generating a second parameter array including second indications for each of a plurality of voting minislots of a second uplink slot, wherein each second indication corresponds to one of no signal, one signal or multiple signals; and
transmitting the second parameter array to the communication network for reception by at least one wireless device.

* * * * *

UNITED STATES PATENT AND TRADEMARK OFFICE
CERTIFICATE OF CORRECTION

PATENT NO. : 8,223,664 B2
APPLICATION NO. : 12/542096
DATED : July 17, 2012
INVENTOR(S) : Ko et al.

It is certified that error appears in the above-identified patent and that said Letters Patent is hereby corrected as shown below:

In the Specification

In Column 11, Line 64, delete "NV" and insert -- A/V --, therefor.

In Column 13, Line 62, delete "and or" and insert -- and/or --, therefor.

Signed and Sealed this
Thirteenth Day of August, 2013

Teresa Stanek Rea
*Acting Director of the United States Patent and Trademark Office*